United States Patent
Kanda

(10) Patent No.: US 8,314,943 B2
(45) Date of Patent: Nov. 20, 2012

(54) IMAGE FORMING APPARATUS, METHOD OF CONTROLLING THE SAME BASED ON SPEECH RECOGNITION, AND COMPUTER PROGRAM PRODUCT

(75) Inventor: Yoshimichi Kanda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 513 days.

(21) Appl. No.: 12/610,774

(22) Filed: Nov. 2, 2009

(65) Prior Publication Data

US 2010/0110489 A1    May 6, 2010

(30) Foreign Application Priority Data

Nov. 5, 2008  (JP) .................................. 2008-284811
Sep. 30, 2009  (JP) .................................. 2009-228580

(51) Int. Cl.
*G06F 1/00* (2006.01)
*G06F 3/12* (2006.01)
*G06K 1/00* (2006.01)
*H04N 1/00* (2006.01)

(52) U.S. Cl. ........................................ 358/1.1; 358/401

(58) Field of Classification Search ................... None
See application file for complete search history.

(56) References Cited

U.S. PATENT DOCUMENTS

| 5,101,438 | A | 3/1992 | Kanda et al. | |
| 7,146,111 | B2 * | 12/2006 | Fujimoto et al. | 399/9 |
| 7,212,307 | B2 | 5/2007 | Kanda | |

FOREIGN PATENT DOCUMENTS

JP    2000-201245    7/2000

OTHER PUBLICATIONS

U.S. Appl. No. 07/122,451, filed Nov. 19, 1987, Yoshiaki Hanyu, et al.

\* cited by examiner

*Primary Examiner* — Douglas Tran
(74) *Attorney, Agent, or Firm* — Oblon, Spivak, McClelland, Maier & Neustadt, L.L.P.

(57) ABSTRACT

An image forming apparatus includes a speech input unit that collects a sound including an ambient sound and a speech from a user for operating the image forming apparatus, a speech recognizing unit that recognizes the speech from collected sound, and an operation control unit that changes, when speech recognizing unit recognizes the speech, an operation state of the image forming apparatus.

14 Claims, 9 Drawing Sheets

IMAGE FORMING APPARATUS, METHOD OF CONTROLLING THE SAME BASED ON SPEECH RECOGNITION, AND COMPUTER PROGRAM PRODUCT

CROSS-REFERENCE TO RELATED APPLICATIONS

The present application claims priority to and incorporates by reference the entire contents of Japanese Patent Application No. 2008-284811 filed in Japan on Nov. 5, 2008 and Japanese Patent Application No. 2009-228580 filed in Japan on Sep. 30, 2009.

BACKGROUND OF THE INVENTION

1. Field of the Invention

The present invention relates to a technology for controlling an image forming apparatus based on speech recognition.

2. Description of the Related Art

In speech recognition, an ambient noise is typically enters a microphone together with a speech uttered by a user. Japanese Patent Application Laid-open No. 2000-201245 discloses a technology related to a copier or a facsimile machine that stops an operation of a device based on the speech recognition.

However, in an image forming apparatus including a plurality of functions such as a scanner and a printer, an operation sound becomes noise when the scanner or the printer is operated, so that the performance of the speech recognition can be degraded, which may cause an error in an operation based on the speech recognition.

SUMMARY OF THE INVENTION

It is an object of the present invention to at least partially solve the problems in the conventional technology.

According to one aspect of the present invention, there is provided an image forming apparatus including: a speech input unit that collects a sound including an ambient sound and a speech from a user for operating the image forming apparatus; a speech recognizing unit that recognizes the speech from collected sound; and an operation control unit that changes, when the speech recognizing unit recognizes the speech, an operation state of the image forming apparatus.

Furthermore, according to another aspect of the present invention, there is provided a method of controlling an image forming apparatus based on speech recognition. The method includes: collecting a sound including an ambient sound and a speech from a user for operating the image forming apparatus; recognizing the speech from collected sound; and changing, when the speech is recognized at the recognizing, an operation state of the image forming apparatus.

Moreover, according to still another aspect of the present invention, there is provided a computer program product including a computer-usable medium having computer-readable program codes embodied in the medium for controlling an image forming apparatus based on speech recognition. The program codes when executed cause a computer to execute: collecting a sound including an ambient sound and a speech from a user for operating the image forming apparatus; recognizing the speech from collected sound; and changing, when the speech is recognized at the recognizing, an operation state of the image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

In the following embodiments, explanation is given for the case in which the image forming apparatus in the present invention is applied to a digital copier as an example; however, the image forming apparatus in the present invention can be applied to any image forming apparatus such as a printer, a scanner, a facsimile machine, and a multifunction product including at least two of a copier function, a printer function, a scanner function, and a facsimile function.

Figure 1:
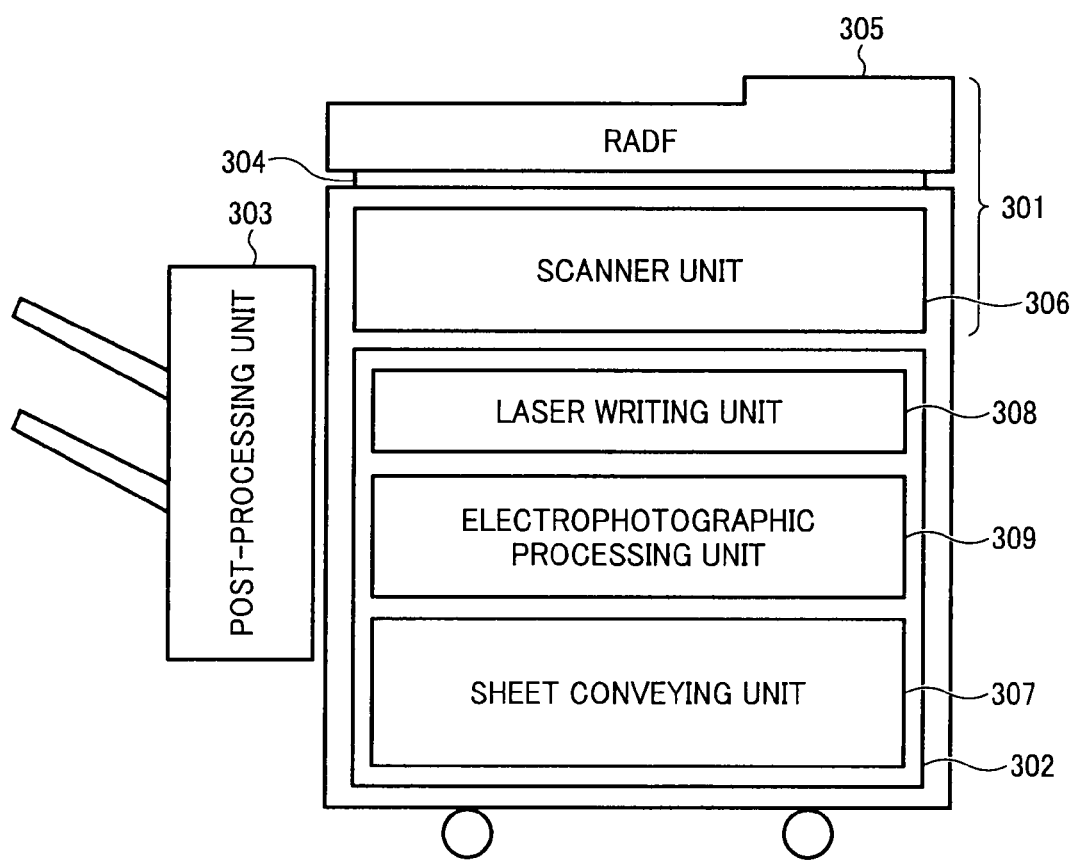
FIG. 1 is a schematic block diagram illustrating a configuration of a digital copier according to a first embodiment of the present invention.

FIG. 1 is a schematic block diagram illustrating a configuration of a digital copier according to a first embodiment of the present invention, in which only relevant portions are illustrated and other units are not shown.

The digital copier performs image formation and printing on a sheet of paper by a scanner unit 301 as an image input unit and a laser recording unit 302 as an image output unit, and aligns output sheets and performs stapling and punching by a post-processing unit 303. The scanner unit 301 and the laser recording unit 302 are devices that output an operation sound.

The scanner unit 301 includes a transparent glass platen 304, a reversing automatic document feeder (RADF) 305 that feeds an original onto an upper surface of the platen 304, and a scanner unit 306 that scans an image on the original placed on the upper surface of the platen 304. Image data scanned by the scanner unit 301 is output to the laser recording unit 302.

The RADF 305 includes a single-side original feeding path that runs from an original tray (not shown) to a discharge tray (not shown) via the platen 304 and a both-side original feeding path that inverts a surface of an original of which image on one side is scanned by the scanner unit 306 and leads the original to the platen again to cope with both of an original with an image on one side and an original with an image on both sides.

The scanner unit 306 irradiates an original with light emitted from a semiconductor laser, and focuses reflection light from the original on a light receiving surface of a photoelectric conversion element by a lens, a mirror, and the like. The photoelectric conversion element converts the reflection light from the image surface of the original to an electric signal and outputs it to an image processing unit 204.

The laser recording unit 302 includes a sheet conveying unit 307 that conveys a sheet, a laser writing unit 308, and an electrophotographic processing unit 309.

The sheet conveying unit 307 includes a sub-conveying path that inverts a surface of a sheet that has passed through a fixing roller and leads it to the electrophotographic processing unit 309 again in a duplex copy mode in which an image is formed on both sides of the sheet.

The laser writing unit 308 includes a semiconductor laser that emits laser light based on image data supplied from the image processing unit 204 and distributes light emitted from the semiconductor laser to a surface of a photoconductive element of the electrophotographic processing unit 309 via a mirror and a lens.

A latent image is formed on the surface of the photosensitive element, which is developed into a toner image by supplying toner from a developing device. The toner image is transferred onto a sheet fed from the sheet conveying unit 307, and thereafter is applied with heat and pressure by the fixing roller, so that the toner image melts and is fixed to the surface of the sheet. After finishing writing of an image on the sheet in this manner, some output sheets are aligned and are subjected to stapling and punching at the post-processing unit 303 to be discharged to a tray.

Figure 2:
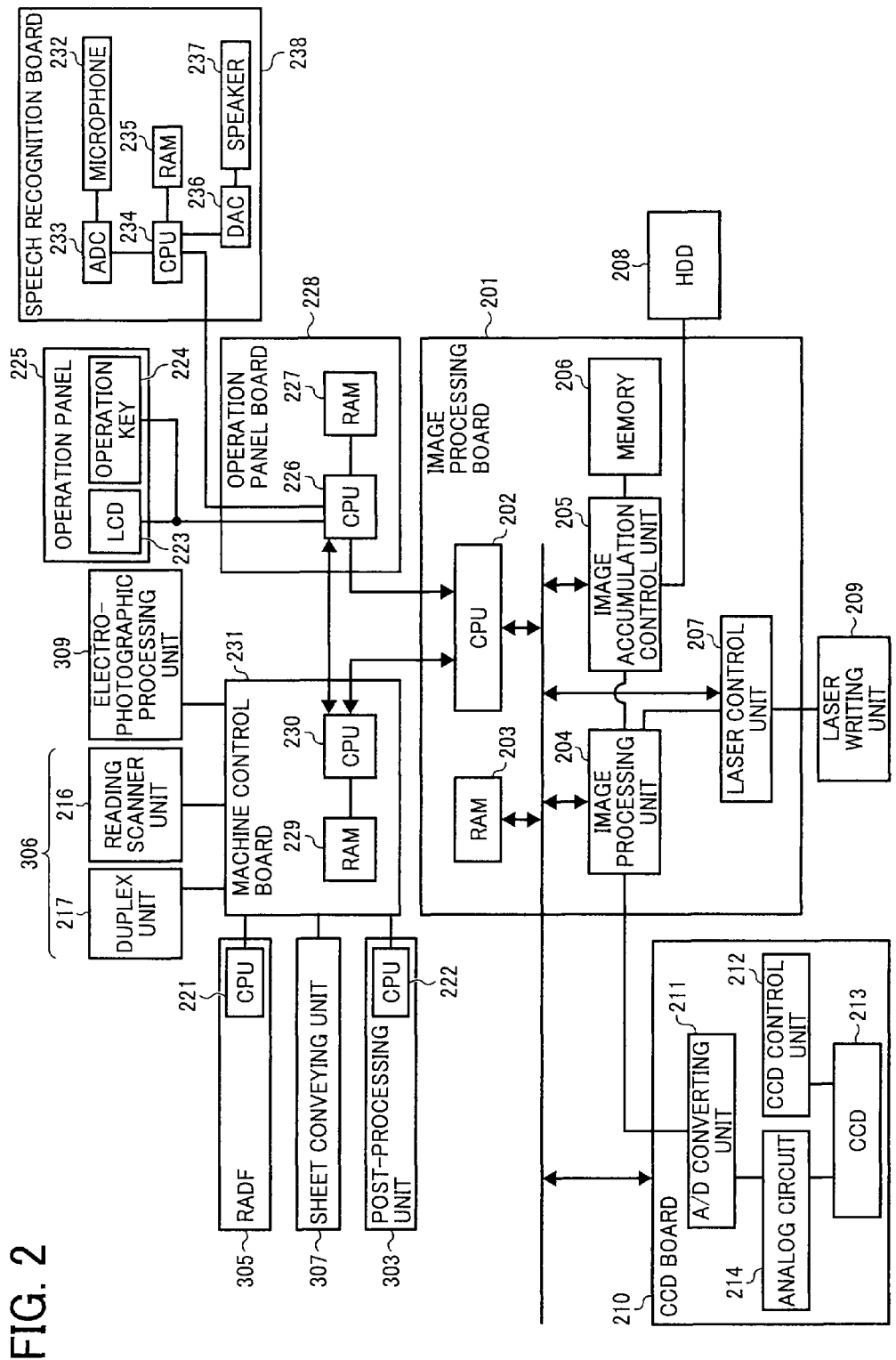
FIG. 2 is a block diagram mainly illustrating a hardware configuration of a control unit of the digital copier according to the first embodiment.

FIG. 2 is a block diagram mainly illustrating a hardware configuration of a control unit of the digital copier according to the first embodiment.

The control unit of the digital copier collectively controls devices constituting each unit via a central processing unit (CPU) mounted on a board arranged for each unit by a CPU 202 mounted on an image processing board 201. A random access memory (RAM) 203 is also used as a working area of the CPU 202.

Specifically, the control unit of the digital copier includes a speech recognition board 238 that includes a liquid crystal display (LCD) 223 that is provided on the upper surface of the digital copier, an operation panel 225 that includes an operation key 224, a microphone 232 that collects a sound around the digital copier, an analog-digital converter (ADC) 233 that converts an analog signal from the microphone to a digital signal, a CPU 234 that performs a speech recognition based on an input signal from the ADC 233, a RAM 235 that is used as a working area of the CPU 234, a digital-analog converter (DAC) 236 that converts a digital signal as a synthesized speech from the CPU 234 to an analog signal, and a speaker 237 that converts the analog signal from the DAC 236 to a speech signal.

Figure 3:
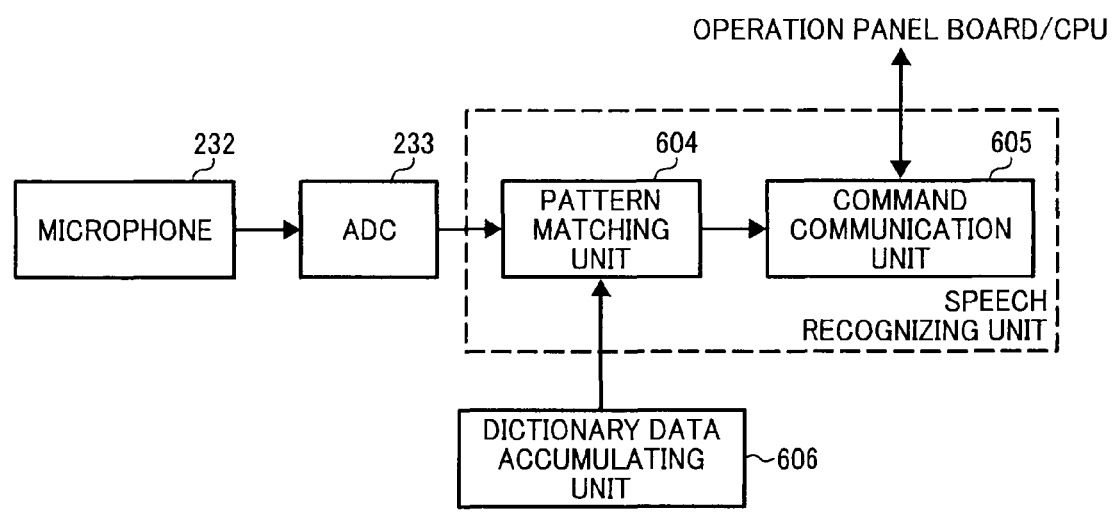
FIG. 3 is a block diagram mainly illustrating a functional configuration of a speech recognizing unit according to the first embodiment.

In the speech recognition board 238, the CPU 234 reads out and executes a speech recognition program stored in a read-only memory (ROM) (not shown), whereby a speech recognizing unit is loaded on the RAM 235. FIG. 3 is a block diagram mainly illustrating a functional configuration of the speech recognizing unit. The speech recognizing unit mainly includes a pattern matching unit 604 and a command communication unit 605.

A speech from a user is supplied as an analog signal from the microphone 232 to the ADC 233, and the ADC 233 converts the analog signal to a digital signal to supply it to the speech recognizing unit as the digital signal. The digital speech signal input to the speech recognizing unit is subjected to the speech recognition in the pattern matching unit 604 by referring to a dictionary data accumulating unit 606 to be recognized as a command. The command communication unit 605 performs communication with a CPU on an operation panel board 228 and transmits the command recognized from the speech uttered by the user.

The dictionary data accumulating unit 606 is a storage medium such as a hard disk drive (HDD) device or a nonvolatile memory (for example, a flash memory), and is mounted on the speech recognition board 238 (not shown in FIG. 2). In the dictionary data accumulating unit 606, dictionary data in which speech patterns of speeches are registered is stored. In the dictionary data, for a speech pattern of a speech for an operation to the digital copier, a command with respect to the operation is further registered in a correlated manner. The operation is input with a speech by a user.

The pattern matching unit 604 refers to the dictionary data in the dictionary data accumulating unit 606 and first performs a pattern matching of a digital speech signal of a speech output from the ADC 233 with the speech patterns registered in the dictionary data and detects a matching speech pattern to perform the speech recognition. Then, the pattern matching unit 604 judges whether a command of an operation is correlated to the speech pattern of the speech-recognized speech in the dictionary data. When a command of an operation is correlated, the pattern matching unit 604 judges that the speech-recognized speech is a speech to the operation and obtains the command correlated to the speech pattern from the dictionary data. The obtained command is transmitted to an operation control unit of a machine control board by the command communication unit 605.

On the other hand, when a command of an operation is not correlated to the speech pattern of the speech-recognized speech, the pattern matching unit 604 judges that the speech-recognized speech is not a speech to the operation and is just chatter from a user. In this case, transmission of a command by the command communication unit 605 is not performed.

Returning to FIG. 2, the control unit of the digital copier further includes the operation panel board 228 (a CPU 226 performs the control of the operation panel 225 by using a RAM 227 as a working area) that exchanges a command with the operation panel 225 and the speech recognition board 238, a machine control board 231 (a CPU 230 performs the control of managing each device by using a RAM 229 as a working area) that manages each device including the electrophotographic processing unit 309, a reading scanner unit 216, and a duplex unit 217 in the digital copier, a charge-coupled device (CCD) board 210 on which a photoelectric conversion element is mounted together with peripherals, and the image processing board 201 on which a CPU that performs various image processing to image data is mounted together with peripherals.

The function of the machine control board 231 is explained. The CPU 230 of the machine control board 231 reads out and executes an operation control program from a ROM (not shown), whereby the operation control unit that changes an operation state of devices (the scanner unit 301 and the laser recording unit 302) in the digital copier is loaded on the RAM 229.

Figure 4:
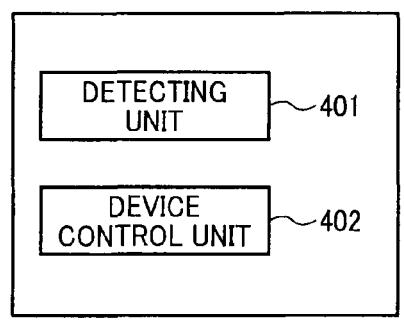
FIG. 4 is a block diagram illustrating a functional configuration of an operation control unit according to the first embodiment.

FIG. 4 is a block diagram illustrating a functional configuration of the operation control unit according to the first embodiment. As shown in FIG. 4, the operation control unit mainly includes a detecting unit 401 and a device control unit 402.

The detecting unit 401 receives and detects a command output from the command communication unit 605 of the speech recognizing unit. When a command is detected by the detecting unit 401, the device control unit 402 changes the operation state of the scanner unit 301 and the laser recording unit 302 as the devices of the digital copier. In the first embodiment, the device control unit 402 controls to stop the operation of the scanner unit 301 and the laser recording unit 302.

Next, image data processing in a copy mode in the digital copier is explained.

An image on an original fed on the platen via the RADF 305 (a CPU 221 controls the operation of the RADF 305) is sequentially scanned by the scanner unit 306.

A CCD 213 on the CCD board 210 in the scanner unit 306 is driven by a CCD control unit 212, and the output signal thereof is gain adjusted in an analog circuit 214 and is transmitted to the image processing board 201 as 8-bit image data from an A/D converting unit 211.

The image data subjected to a predetermined image processing in the image processing unit 204 is once accumulated in a memory 206 by an image accumulation control unit 205.

The image accumulated in the memory 206 is next stored in an HDD 208. The above processing is performed on all of originals set on the RADF 305.

After scanning images, a plurality of pieces of image data stored in the HDD 208 is subjected to a reading processing in order of page repeatedly for a set number of times by the image accumulation control unit 205. Then, after a predetermined image processing in the image processing unit 204, the image data is supplied to a laser writing unit 209 via a laser control unit 207. Then, after writing an image on a sheet, some output sheets are aligned and are subjected to stapling and punching in the post-processing unit 303 (a CPU 222 controls the operation of the post-processing unit 303), and discharged to a tray. When all of originals are already stored in the HDD 208 and the printing operation is performed by reading out from the HDD 208, the scanner unit 301 is in an empty state, so that the scanner unit 301 can be used for the next reserved job.

At this time, when the speech recognition board 238 is operated, the laser recording unit 302 or the post-processing unit 303 are operated, so that the operation sound thereof becomes noise and therefore the recognition rate of the speech recognition may degrade. The operation in the present embodiment to prevent such defect is explained.

Figure 5:
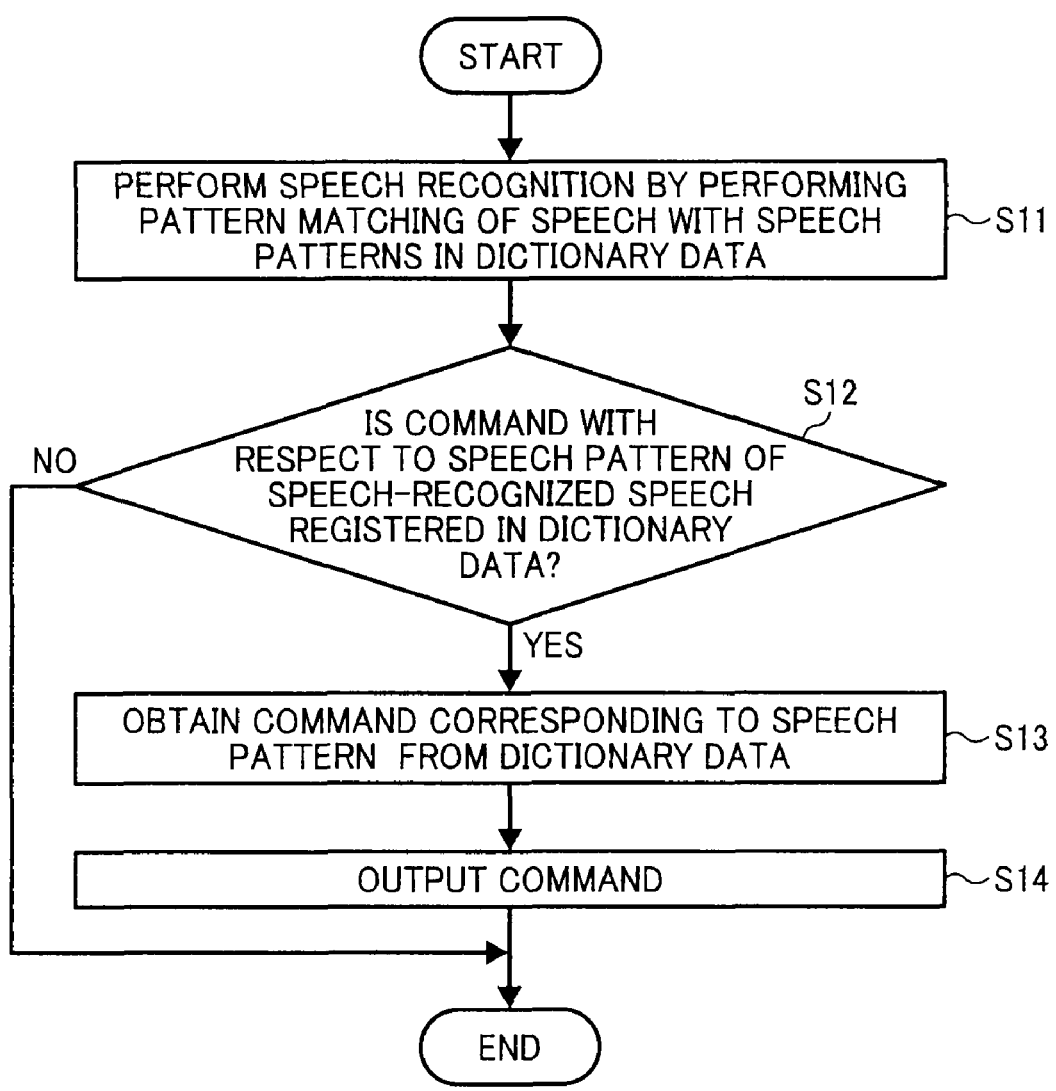
FIG. 5 is a flowchart illustrating a procedure of a speech recognizing processing according to the first embodiment.

First, the speech recognition processing performed in the speech recognizing processing unit of the speech recognition board 238 is explained. FIG. 5 is a flowchart illustrating a procedure of the speech recognizing processing according to the first embodiment.

The pattern matching unit 604 first inputs a speech (digital speech signal) of a user from the ADC 233, and performs the speech recognition by performing the pattern matching of the speech with the speech patterns registered in the dictionary data of the dictionary data accumulating unit 606 (Step S11).

Next, the pattern matching unit 604 judges whether a command of an operation is registered in the dictionary data with respect to a speech pattern of the speech-recognized speech for judging whether the speech-recognized speech is a speech corresponding to an operation (Step S12).

When a command of an operation is registered with respect to the speech pattern of the speech-recognized speech (Yes at Step S12), the pattern matching unit 604 judges that the speech-recognized speech is a speech corresponding to the operation and obtains the command from the dictionary data (Step S13). Then, the command communication unit 605 transmits the obtained command to the operation control unit of the machine control board 231 (Step S14).

On the other hand, at Step S12, when the pattern matching unit 604 judges that a command of an operation is not registered in the dictionary data with respect to the speech pattern of the speech-recognized speech (No at Step S12), the pattern matching unit 604 judges that the speech-recognized speech is not a speech corresponding to an operation but is just chatter or the like from the user and does not perform a transmission of a command.

The command by the speech recognized in the speech recognizing unit of the speech recognition board 238 is transmitted to the machine control board 231 and the image processing board 201 via the operation panel board 228. The operation control processing performed in the operation control unit of the machine control board 231 at this time is explained.

Figure 6:
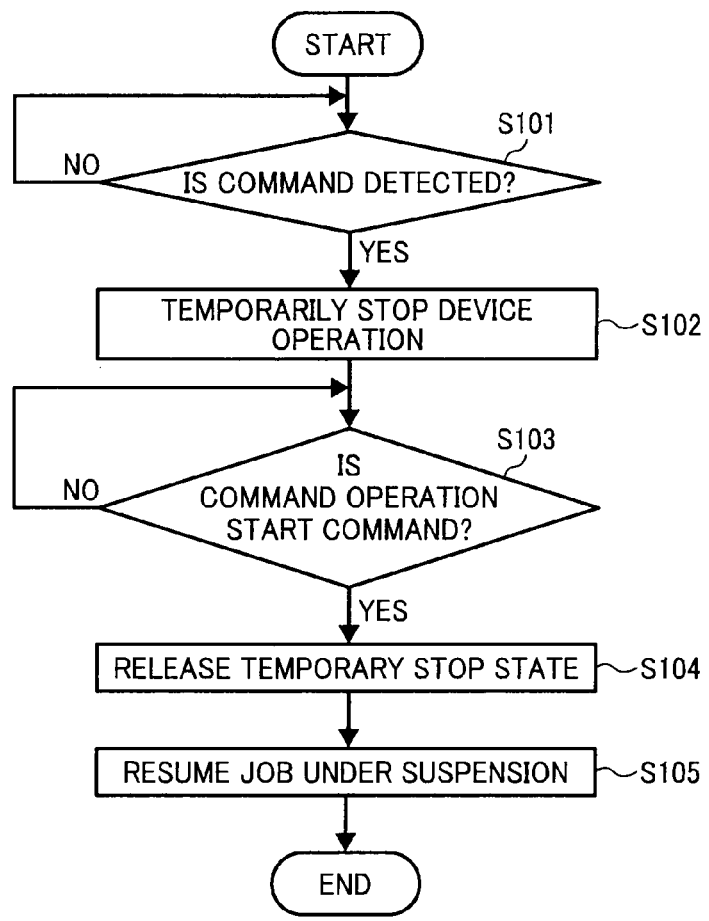
FIG. 6 is a flowchart illustrating a procedure of an operation control processing according to the first embodiment.

FIG. 6 is a flowchart illustrating a procedure of the operation control processing according to the first embodiment. When the detecting unit 401 of the operation control unit detects a command from the speech recognition board 238 (Yes at Step S101), the device control unit 402 temporarily stops an operation of devices (Step S102). Specifically, the device control unit 402 temporarily stops the electrophotographic processing unit 309, the duplex unit 217, the sheet conveying unit 307, and the post-processing unit 303 that are related units, whereby the printing operation by the laser recording unit 302 is stopped.

Thereafter, the detecting unit 401 becomes a command reception waiting state (Step S103). When the detecting unit 401 detects that a job start command is issued from the command communication unit 605 of the speech recognition board 238 (Yes at Step S103), the device control unit 402 releases the temporary stop state of the devices (Step S104) and resumes the job under suspension (Step S105). In the CPU 202 of the image processing board 201 also, the image processing operation is temporarily stopped and is resumed in accordance with the command from the speech recognition board 238 synchronizing with the machine control board 231.

In the first embodiment, when there is a speech for an operation from a user, an operation of devices is stopped, so that it is possible to prevent that an operation sound generated in a device operation becomes noise and the recognition rate of the speech decreases. Therefore, according to the first embodiment, the recognition rate of the speech recognition can be improved and an operation by the speech recognition can be accurately performed.

In the first embodiment, the pattern matching is performed by using the dictionary data in which a speech pattern of a speech for an operation is correlated to a command of the operation as a method to judge whether a speech-recognized speech is a speech for an operation in the speech recognizing unit; however, it is not limited thereto. For example, it is possible to judge whether a speech-recognized speech is a speech for an operation based on the volume (decibel (dB)) of the speech. More specifically, because the volume of a speech of a normal human being in an operation is 60 dB or more whereas the volume of an operation sound of a device is about 50 dB, it is possible to judge whether a speech of a user is a speech for an operation by judging a comparison result between the volume of the speech by a user and a predetermined threshold, for example, by judging whether the volume of the speech by the user is 60 dB as the predetermined threshold or more, or by judging detection of whether the volume is around 60 dB as the predetermined threshold.

When noise is to the degree that it is generated by a single operation of, for example, image reading or image printing, the speech recognition is not influenced depending on a digital copier. However, noise generated is large when both of the operations are performed simultaneously, so that the recognition rate may degrade. For example, such a case occurs in making an instruction by the speech recognition to reserve an output job of an accumulated document accumulated in the HDD 208 in advance when an image is printed while inputting an image from a scanner.

Therefore, as a modified example, the device control unit 402 can be configured to perform a control to temporarily stop only one of the image reading operation and the image printing operation. In other words, when there is a plurality of devices such as the laser recording unit 302 and respective units thereof or the scanner unit 301 and respective units thereof, if the detecting unit 401 detects a command, the device control unit 402 can control to stop part of the devices (single device or part of the devices) so that all of the devices do not operate simultaneously. Therefore, noise generated from the devices can be reduced, so that it is possible to prevent the recognition rate of the speech recognition from decreasing due to noise generated in a device operation while suppressing reduction in productivity. Thus, according to the modified example, the recognition rate of the speech recognition can be improved while suppressing reduction in productivity and the operation by the speech recognition can be accurately performed.

Moreover, in this case, the device control unit 402 can be configured to stop a device whose frequency is closer to a speech for an operation by a user. For example, because the frequency of a speech is different between men and women, it is possible to control to stop a device that generates an operation sound whose frequency is closer to the frequency of a speech by a user. Thus, the recognition rate of the speech recognition can be further improved, resulting in performing an operation by the speech recognition more accurately.

In some digital copiers, when the image reading operation or the image printing operation is performed at a normal speed, noise is generated to the degree of influencing the speech recognition; however, when operated at a speed lower than the speed in the normal operation, for example, at about a half of the speed in the normal operation, noise is small and the recognition rate of the speech recognition does not degrade. The operation at about ½ of the speed in the normal operation, for example, means that printing 60 pages a minute is reduced to a half, i.e., 30 pages a minute. In this case, the motor of each of the electrophotographic processing unit 309, the sheet conveying unit 307, and the post-processing unit 303 operates at a half of the speed in the normal operation, so that noise can be reduced.

Figure 7:
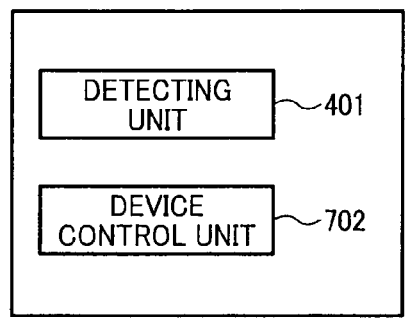
FIG. 7 is a block diagram illustrating a functional configuration of an operation control unit according to a second embodiment of the present invention.

FIG. 7 is a block diagram illustrating a functional configuration of an operation control unit in the machine control board 231 according to a second embodiment of the present invention. As shown in FIG. 7, the operation control unit according to the second embodiment includes the detecting unit 401 and a device control unit 702. The function of the detecting unit 401 is similar to that according to the first embodiment.

When the detecting unit 401 detects a command, the device control unit 702 according to the second embodiment controls so that the scanner unit 301, the laser recording unit 302, and the like as devices of the digital copier are operated at a speed lower than the speed in the normal operation, specifically, ½ of the speed in the normal operation. Other configurations such as the speech recognition board and the speech recognizing processing are similar to those in the first embodiment.

Figure 8:
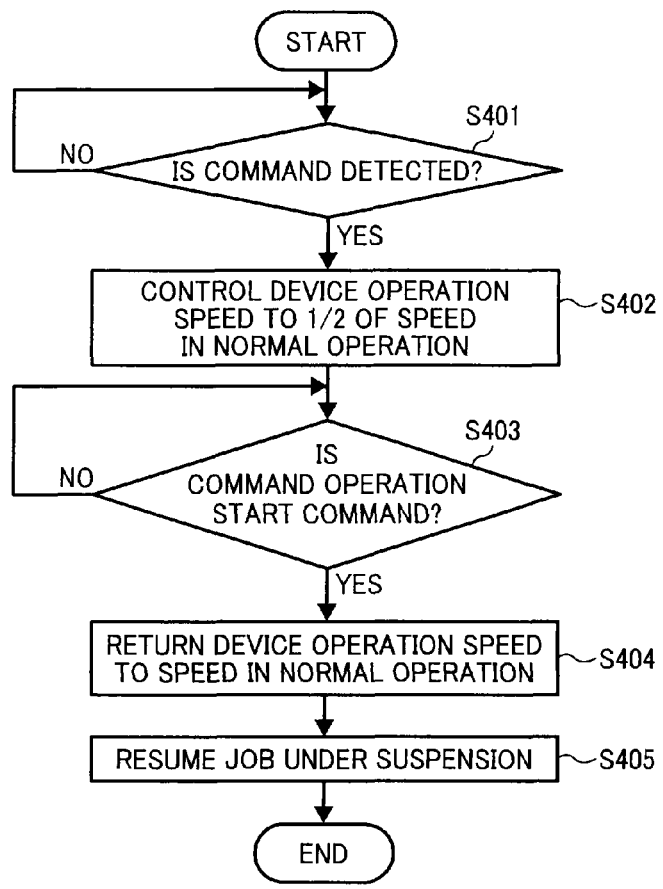
FIG. 8 is a flowchart illustrating a procedure of an operation control processing according to the second embodiment.

Next, the operation control in the second embodiment configured as above is explained. FIG. 8 is a flowchart illustrating a procedure of an operation control processing in the second embodiment. When the detecting unit 401 detects a command from the speech recognition board 238 (Yes at Step S401), the device control unit 402 controls the speed of an operation of devices (for example, a printing operation by the laser recording unit 302) to ½ of the speed in the normal operation (Step S402). Specifically, the device control unit 402 causes the electrophotographic processing unit 309, the duplex unit 217, the sheet conveying unit 307, the post-processing unit 303 that are related units to operate at ½ of the speed in the normal operation, thereby changing the speed of the printing operation by the laser recording unit 302 to ½.

Thereafter, the detecting unit 401 becomes a command reception waiting state (Step S403). When the detecting unit 401 detects that a job start command is issued from the command communication unit 605 of the speech recognition board 238 (Yes at Step S403), the device control unit 402 returns the speed of the devices to the speed in the normal operation (Step S404) and resumes the job under suspension (Step S405). In the CPU 202 of the image processing board 201 also, the processing is performed at a speed matching the printing operation speed that ½ of the speed in the normal operation in accordance with the command from the speech recognition board 238 synchronizing with the machine control board 231.

According to the second embodiment, when there is a speech for an operation from a user, an operation speed of devices is controlled to be lower than the operation speed in the normal operation, so that it is possible to suppress generation of an operation sound and prevent that an operation sound becomes noise and the recognition rate of the speech degrades. Thus, according to second embodiment, the recognition rate of the speech recognition can be further improved and an operation by the speech recognition can be accurately performed.

In the second embodiment, the operation speed of devices is controlled to ½ of the speed in the normal operation; however, it is not limited thereto, and can be controlled arbitrary so long as the speed is lower than the speed in the normal operation.

Assuming that various users use a digital copier, it is considered that the speech recognition can be performed with good recognition rate even when the digital copier makes a noise in the operating state in a case of a user whose speech level is high whereas the recognition rate decreases when the digital copier makes a noise in the operating state in a case of a user whose speech level is low.

Therefore, in a third embodiment of the present invention, an operation of devices is controlled considering a case that the speech level of a user is low when the digital copier makes a noise in the operating state, thereby improving the performance of the speech recognition.

Figure 9:
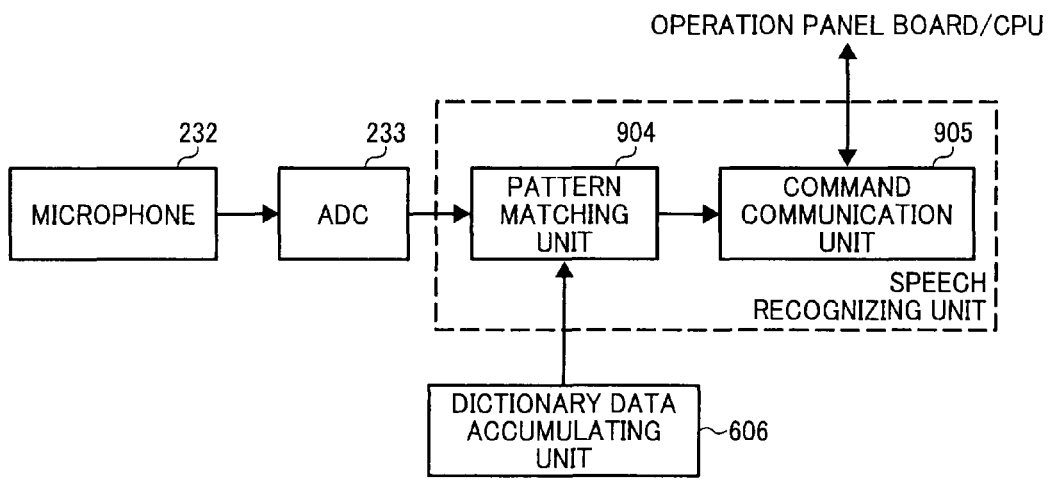
FIG. 9 is a block diagram illustrating a functional configuration of a speech recognizing unit according to a third embodiment of the present invention.

FIG. 9 is a block diagram illustrating a functional configuration of a speech recognizing unit according to the third embodiment. As shown in FIG. 9, the speech recognizing unit according to the third embodiment mainly includes a pattern matching unit 904 and a command communication unit 905.

The function of the command communication unit 905 is similar to that in the first embodiment.

The pattern matching unit 904 according to the third embodiment performs the speech recognition by performing the pattern matching of a speech (a digital speech signal input from the ADC 233) of a user with the speech patterns in the dictionary data stored in the dictionary data accumulating unit 606 in the similar manner to the first embodiment. When the speech recognition succeeds, the processing similar to the first embodiment is performed. However, when the speech recognition fails, the CPU 234 (see FIG. 2) as an output unit instructs the user from the speaker 237 via the DAC 236 to reinput a speech command.

The configuration and the function of the operation control unit in the machine control board 231 and other configurations are similar to the first embodiment.

Figure 10:
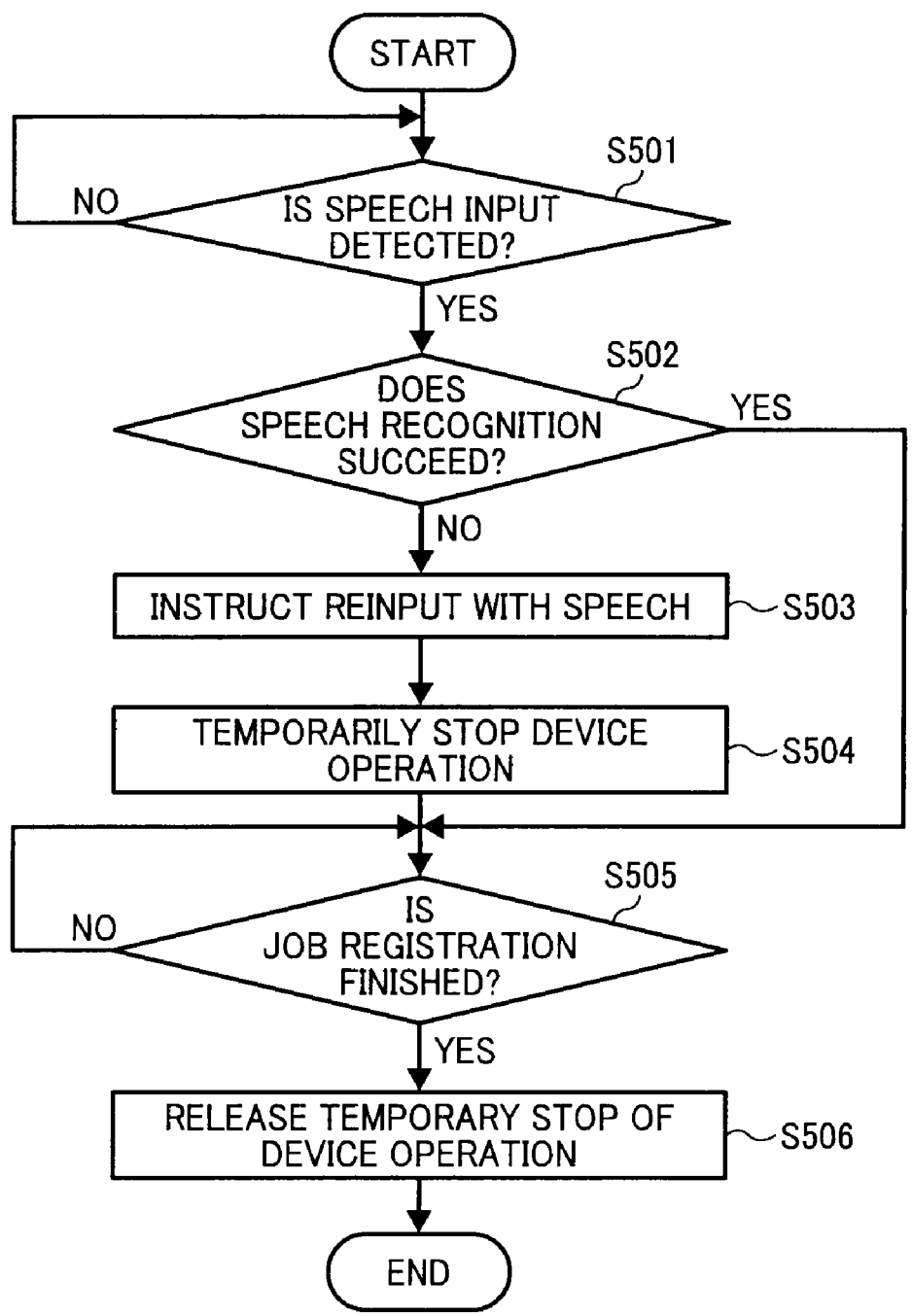
FIG. 10 is a flowchart illustrating a procedure of a speech recognizing processing according to the third embodiment.

Next, the speech recognizing processing in the digital copier according to the third embodiment configured as above is explained. FIG. 10 is a flowchart illustrating a procedure of the speech recognizing processing in the third embodiment.

When the speech recognition board 238 detects a frequency distribution or the like unique to a speech of data, which is input from the microphone 232 and is converted to a digital signal in the ADC 233, and detects the speech input, by the CPU 234 (Yes at Step S501), the speech recognition is performed by the pattern matching unit 904. When the speech recognition succeeds (Yes at Step S502), a jog registration is performed as per normal.

On the other hand, when the speech recognition fails (No at Step S502), the CPU 234 instructs a user from the speaker 237 via the DAC 236 to reinput a speech command (Step S503). The reinput instruction of a speech command instructed to the user is, for example, "Speech recognition failed. Please instruct with speech again after devices are temporarily stopped".

Thereafter, the CPU 234 instructs a temporal stop of an operation of devices (Step S504). When the user reinputs the speech command and a job registration is finished (Yes at Step S505), the CPU 234 releases the temporary stop of the device operation (Step S506).

The instruction related to the device operation in the procedure of the CPU 234 on the speech recognition board 238 is notified to the CPU 230 (i.e., the device control unit 402 of the operation control unit) on the machine control board 231 and the CPU 202 on the image processing board 201 via the CPU 226 on the operation panel board 228, whereby the operation state of the entire device is changed.

In this manner, in the third embodiment, when the speech recognition of a speech of a user fails, an instruction of reinput is output to perform a temporal stop of an operation of devices, so that the operation of devices is controlled considering a case that the speech level of a user is low when the digital copier makes a noise in the operation state to improve the performance of the speech recognition. Consequently, the operation by the speech recognition can be recognized more accurately.

A fourth embodiment of the present invention is another embodiment to prevent the recognition rate of the speech recognition from decreasing due to noise generated by devices at an operation.

Figure 11:
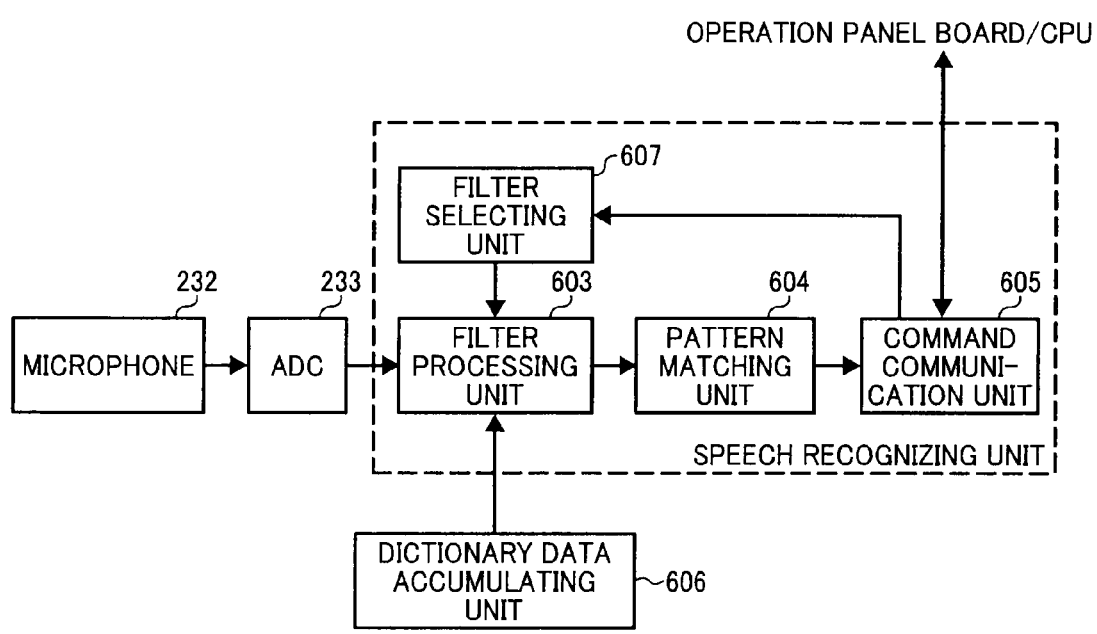
FIG. 11 is a block diagram illustrating a functional configuration of a speech recognizing unit according to a fourth embodiment of the present invention.

FIG. 11 is a block diagram illustrating a functional configuration of a speech recognizing unit according to the fourth embodiment. As shown in FIG. 11, the speech recognizing unit according to the fourth embodiment mainly includes a filter processing unit 603, a filter selecting unit 607, the pattern matching unit 604, and the command communication unit 605. The function of the pattern matching unit 604 and the command communication unit 605 is similar to that in the first embodiment.

The filter selecting unit 607 includes a plurality of filters to reduce noise and selects a filter in accordance with an operation state of a digital copier. The filter processing unit 603 performs a filtering processing for reducing noise of an input speech by using the filter selected by the filter selecting unit 607.

More specifically, a speech from a user is supplied to the ADC 233 as an analog signal from the microphone 232, and an ADC 602 converts the analog signal to a digital signal to supply it to a CPU as the digital signal. The digital speech signal of the input speech is subjected to the filtering processing in the filter processing unit 603 for removing noise other than the speech and the like. Data after the filtering processing is subjected to the speech recognition by a method similar to the first embodiment by referring to the dictionary data accumulating unit 606 by the pattern matching unit 604 to be recognized as a command. Communication with the CPU on the operation panel board 228 is performed in the command communication unit 605 to transmit the command recognized from the speech uttered by the user. In the device operation, the CPU on the operation panel board 228 transmits the operation state to the command communication unit 605 in advance.

The command communication unit 605 transmits the operation state to the filter selecting unit 607. The filter selecting unit 607 includes filters that are created in advance for appropriately removing noise generated in each operation state of devices based on the noise. The filter selecting unit 607 selects an appropriate filter based on the operation state transmitted from the command communication unit 605 from among the filters and supplies it to the filter processing unit 603.

Figure 12A:
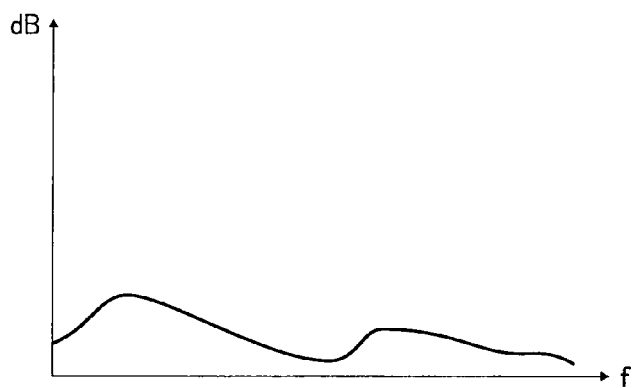
FIGS. 12A to 12C are graphs showing frequency distributions of noise.
Figure 12B:
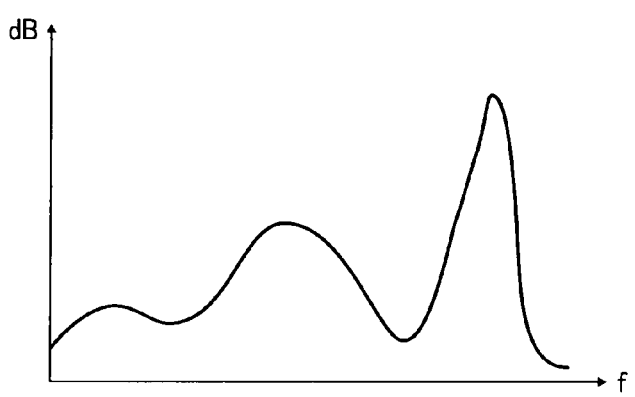

FIG. 12A illustrates a frequency distribution of noise generated by a device itself when the device operates, and FIG. 12B illustrates a frequency distribution that is obtained by superimposing the frequency in FIG. 12A when the noise is generated on a frequency when a user inputs a speech.

Figure 12C:
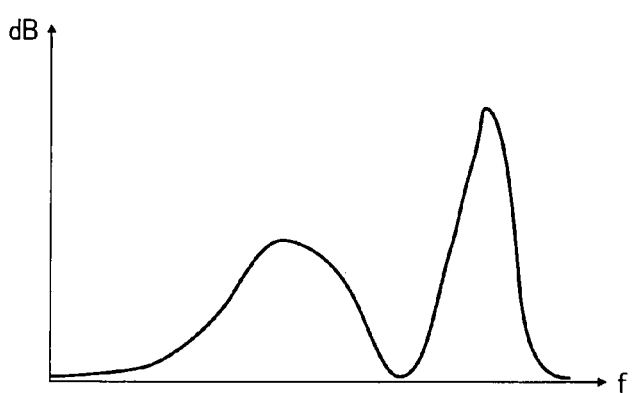

In this state, a frequency distribution through the filtering processing in the fourth embodiment is illustrated in FIG. 12C, which shows that a frequency component of the noise (part with large dB value in the vertical axis) generated by the device is removed and only the frequency distribution of the speech input given by the user is output from the filter processing unit 603 to the subsequent stage.

According to the fourth embodiment, because a filter in accordance with an operation state is selected and the filtering processing is performed by using the selected filter, a frequency component of noise generated by a device can be efficiently removed, thereby preventing the recognition rate of the speech recognition from decreasing due to the noise generated in the device operation. Thus, according to the fourth embodiment, the recognition rate of the speech recognition can be improved and therefore the operation by the speech recognition can be accurately performed.

According to an aspect of the present invention, the recognition rate of the speech recognition is improved for noise generated in a device operation by changing an operation state of a device at the speech recognition such that the noise is made small, and consequently an operation by the speech recognition can be accurately performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a speech input unit that collects a sound including an ambient sound and a speech from a user for operating the image forming apparatus;
    a speech recognizing unit that recognizes the speech from collected sound; and
    an operation control unit that changes, when the speech recognizing unit recognizes the speech, an operation state of the image forming apparatus.

2. The image forming apparatus according to claim 1, wherein the operation control unit stops operation of the image forming apparatus when the speech recognizing unit recognizes the speech.

3. The image forming apparatus according to claim 1, further comprising a plurality of devices each outputting an operation sound, wherein
    the operation control unit changes the operation state such that the devices do not operate simultaneously, when the speech recognizing unit recognizes the speech.

4. The image forming apparatus according to claim 3, wherein the operation control unit compares a frequency of recognized speech with a frequency of the operation sound of each of the devices and stops an operation of a device that generates an operation sound with a frequency that is closer to the frequency of the recognized speech.

5. The image forming apparatus according to claim 4, wherein
    the devices include
        an image input unit that inputs image data,
        an image processing unit that performs an image processing on input image data, and
        an image output unit that outputs image data on which the image processing is performed, and
    the operation control unit stops one of the image input unit and the image output unit whichever generates the operation sound with the frequency that is closer to the frequency of the recognized speech.

6. The image forming apparatus according to claim 1, further comprising a device that outputs an operation sound, wherein
    the operation control unit changes the operation state such that an operation speed of the device is reduced, when the speech recognizing unit recognizes the speech.

7. The image forming apparatus according to claim 6, wherein
    the device includes
        an image input unit that inputs image data,
        an image processing unit that performs an image processing on input image data, and
        an image output unit that outputs image data on which the image processing is performed, and
    the operation control unit reduces operation speeds of the image input unit and the image output unit, when the speech recognizing unit recognizes the speech.

8. The image forming apparatus according to claim 1, wherein
    the speech recognizing unit includes
        a judging unit that judges whether the recognized speech is a speech pertaining to an operation of the image forming apparatus, and
        a command communication unit that, when the judging unit judges that the recognized speech is a speech pertaining to an operation of the image forming apparatus, outputs a command corresponding to the recognized speech to the operation control unit, and
    the operation control unit includes
        a detecting unit that detects the command output from the command communication unit, and
        a device control unit that changes the operation state upon the detecting unit detecting the command.

9. The image forming apparatus according to claim 8, wherein
    the speech recognizing unit further includes a storing unit that stores therein a speech pattern of the speech pertaining to the operation and the command corresponding to the operation,
    the judging unit judges whether the recognized speech matches the speech pattern stored in the storing unit, and when the recognized speech matches the speech pattern, judges that the recognized speech is the speech pertaining to the operation, and
    the command output unit outputs a command corresponding to the speech pattern that matches the recognized speech to the operation control unit.

10. The image forming apparatus according to claim 8, wherein the judging unit compares a volume of the recognized speech with a predetermined threshold, and judges that the recognized speech is the speech corresponding to the command corresponding to the operation based on a result of comparison.

11. The image forming apparatus according to claim 1, further comprising an output unit that, when the speech recognizing unit does not recognize the speech, prompts the user to repeat the speech.

12. The image forming apparatus according to claim 1, further comprising a plurality of filters for reducing noise, wherein
    the speech recognizing unit includes
        a filter selecting unit that selects a filter according to the operation state of the image forming apparatus from among the filters, and
        a filter processing unit that performs a filtering processing for reducing noise from the collected sound by using selected filter, and
    the speech recognizing unit recognizes the speech from the collected sound on which the filtering processing is performed.

13. A method of controlling an image forming apparatus based on speech recognition, the method comprising:
    collecting a sound including an ambient sound and a speech from a user for operating the image forming apparatus;
    recognizing the speech from collected sound; and
    changing, when the speech is recognized at the recognizing, an operation state of the image forming apparatus.

14. A non-transitory computer-readable storage medium having computer-readable program codes embodied in the medium for controlling an image forming apparatus based on speech recognition, the program codes when executed causing a computer to execute:
    collecting a sound including an ambient sound and a speech from a user for operating the image forming apparatus;
    recognizing the speech from collected sound; and
    changing, when the speech is recognized at the recognizing, an operation state of the image forming apparatus.

* * * * *